United States Patent [19]

Sgourakes et al.

[11] Patent Number: 4,604,891
[45] Date of Patent: Aug. 12, 1986

[54] REFERENCE PRESSURE DEVICES FOR CALIBRATING PRESSURE-MEASURING INSTRUMENTS

[75] Inventors: George E. Sgourakes, Mills; John P. Angelosanto, North Attleboro; Barry T. Malloy, Norton, all of Mass.

[73] Assignee: The Foxboro Company, Foxboro, Mass.

[21] Appl. No.: 661,806

[22] Filed: Oct. 17, 1984

[51] Int. Cl.$^4$ ............................................. G01L 27/00
[52] U.S. Cl. ......................................................... 73/4 R
[58] Field of Search ........................... 73/4 R, 4 V, 4 D

[56] References Cited

FOREIGN PATENT DOCUMENTS

| 1948220 | 4/1970 | Fed. Rep. of Germany. | |
| 16632 | of 1909 | United Kingdom | 73/4 D |
| 513284 | 5/1976 | U.S.S.R. | 73/4 R |
| 830169 | 5/1981 | U.S.S.R. | 73/4 R |
| 970156 | 10/1982 | U.S.S.R. | 73/4 R |
| 1008633 | 3/1983 | U.S.S.R. | 73/4 R |

OTHER PUBLICATIONS

"High Accuracy Pressure Measurement and Calibration"; *Fluid Power International;* Sep. 1970; pp. 56–58; A. C. Colthorpe.

Primary Examiner—Stewart J. Levy
Assistant Examiner—Tom Noland
Attorney, Agent, or Firm—Parmelee, Bollinger & Bramblett

[57] ABSTRACT

A differential-pressure transmitter having a range diaphragm and a slack diaphragm to receive process pressures and to apply such pressures to an interior sealed chamber containing a fill-liquid. A vertically-oriented tube containing liquid communicating with the instrument fill-liquid contains a ball movable by gravity down through the liquid to create a reference-pressure pulse directed to the range diaphragm to provide for checking instrument performance. A relatively large weight is suspended from the ball to increase the effect of gravity on the ball, so as to increase the magnitude of the reference-pressure pulse. A flexible seal-and-pivot connection is provided at the top of the tube to permit substantial inclinations of the instrument relative to vertical without interference with the wall of the tube. The additional weight is in one embodiment divided into vertically-separable segments to provide for successive bottoming of the segments as the weight descends, to provide a stepped pressure pulse. Errors due to change in static pressure are avoided or reduced by special compensating arrangements.

29 Claims, 13 Drawing Figures

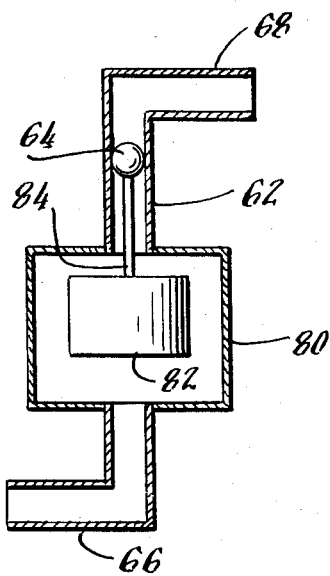
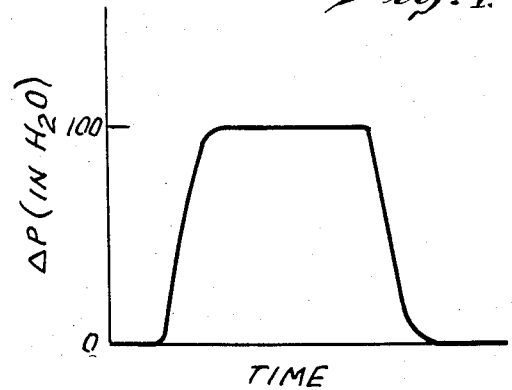
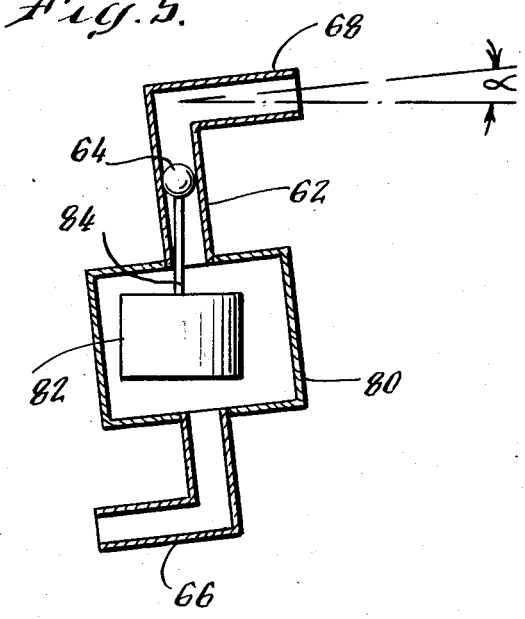
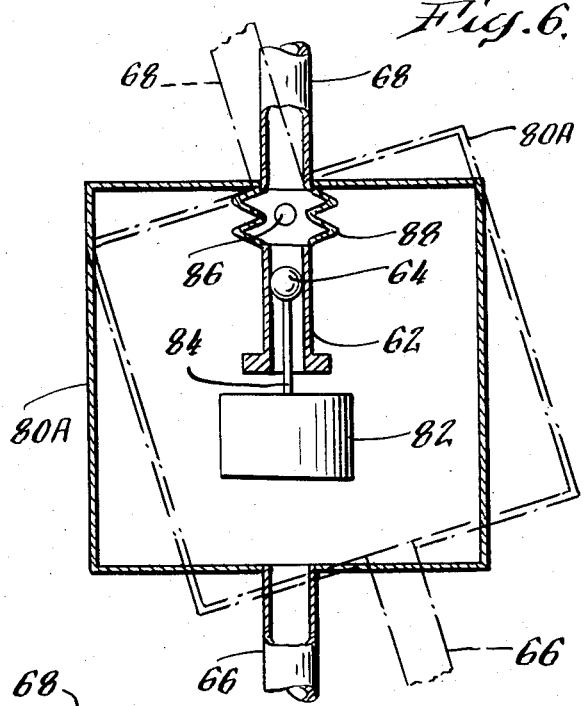
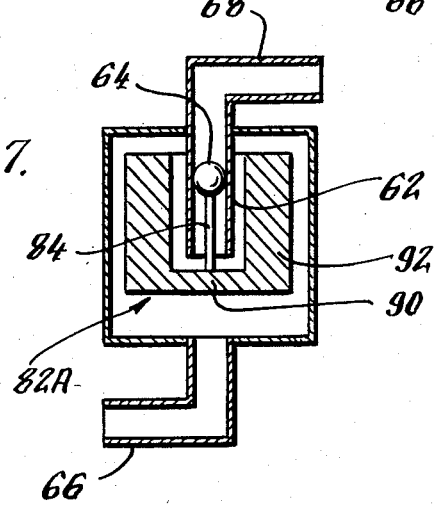

REFERENCE PRESSURE DEVICES FOR CALIBRATING PRESSURE-MEASURING INSTRUMENTS

BACKGROUND OF THE INVENTION

1. Field of the Invention

This invention relates to apparatus for measuring fluid pressures including differential fluid pressures. More particularly, this invention relates to improvements in means for calibrating pressure measuring apparatus to assure accurate readings, and also to improvements in means for diagnosing the condition of such apparatus.

2. Description of the Prior Art

Instrumentation systems for use with industrial processes have employed apparatus of various kinds for measuring fluid pressures, especially differential pressures such as are produced across an orifice plate in a flow pipe for the purpose of developing a fluid flow-rate signal. U.S. Pat. No. 4,165,651 to Everett Olsen shows a differential pressure transmitter of advanced design, employing a vibratable wire tensioned in accordance with the differential pressure being measured so that the frequency of vibration provides an accurate measure of the differential pressure. Still other devices are available commercially based on different principles, such as the use of strain-gauge IC chips for sensing applied pressures.

Pressure measuring instruments often are installed in places where they are subject to widely varying environmental conditions, such as changing ambient temperatures. Consequently, it is not uncommon for the instrument zero-set and span calibration to drift or in some way be offset, resulting in erroneous readings. Since the instruments frequently are in locations which are not readily accessible for routine maintenance, zero-set and calibration errors in many cases have not been easily correctible by operating personnel. Moreover, calibrating the span of instruments of the kinds available heretofore typically has involved relatively complex and time-consuming procedures.

Because of the importance of minimizing measurement errors, various proposals have been made for solving or ameliorating these problems. For example, remotely-operated zero-set apparatus now is available for use with differential-pressure transmitters. Such apparatus comprises a remotely-controllable pressure manifold which, upon command, blocks the low-pressure process line and by-passes the high-pressure process line to the high and low sides of the transmitter, producing a zero differential-pressure condition. If under such circumstances the transmitter output signal differs from that indicating zero differential pressure, the error is stored in memory and thereafter is used (as by means of a microprocessor) to correct the output signal when measurements are resumed.

However, such remote-set of instrument zero does not correct for errors in span calibration. Thus, in an effort to avoid the effects of such errors, differential pressure-transmitters have been designed to include one or more condition-sensing elements (such as temperature and static pressure sensors) arranged to function with associated devices to automatically adjust the transmitter output signal in response to changes in the sensed conditions. For example, the transmitter output signal may be controllably altered in accordance with a predictive algorithm stored in a microprocessor forming part of the instrument.

Although such compensator arrangements improve the accuracy of the pressure measurement, they have not satisfactorily solved the problem. In part, this is because such techniques are not capable of achieving the desired accuracy, particularly since there remain other uncompensated variables. Thus, the need for instrument re-calibration from time to time is not eliminated. Moreover, such compensator arrangements are relatively costly to implement.

In copending application Ser. No. 06/661,807, filed by George E. Sgourakes on Oct. 17, 1984 (and assigned to the assignee of this application), there is shown a pressure measuring instrument having means for monitoring the span calibration so that such calibration can be reset as necessary. This span calibration means comprises a reference pressure device for developing and applying to the instrument a reference pressure pulse of precisely-controlled magnitude. In the preferred embodiment, the device includes a vertically-oriented cylindrical tube containing a fill-liquid which communicates with fill-liquid in the instrument. A solid metal ball in the tube can be raised to the top of the tube (as by an externally-developed magnetic field) and then released. The ball drops under the force of gravity through the fill-liquid to produce a pressure pulse of essentially constant magnitude over much of the drop distance. This pressure pulse is used as a reference pressure for setting the span calibration of the instrument, as by adjusting electronic circuitry forming part of the instrument, or located remotely from the instrument.

One important advantage of the invention disclosed in said copending application is that it makes possible remote calibration of the instrument. Such calibration moreover is quite accurate, and can be made while the instrument is under static process pressure.

It has been found advantageous for certain calibration needs to provide a reference pressure pulse of magnitude substantially larger than can be produced by the device shown in said copending application. It is the purpose of this invention to provide means for developing such larger magnitude pressure signals, and to effect other improvements as will be described.

SUMMARY OF THE INVENTION

There is disclosed herein a reference-pressure device of the type basically as described above comprising a cylindrical tube containing a fill-liquid communicating with an associated pressure measuring instrument, and containing a ball which is forced through the fill-liquid by gravity to produce a pressure pulse of essentially constant magnitude for use in calibrating the span of the instrument. In accordance with a principal aspect of the present disclosure, the magnitude of this reference pressure pulse is substantially increased by suspending an ancillary weight from the ball so as to augment the force applied to the ball. This increase in force in effect increases the apparent density of the ball. Since the magnitude of the pressure pulse is proportional to the relative densities of the ball and the fill-liquid, the increase in apparent ball density correspondingly increases the reference pressure pulse.

This "pendulum" configuration of ball and suspended weight is relatively insensitive to the effects of inclination of the instrument, i.e. to orientations offset from the normal vertical position. For the possible cases where severe inclinations may be encountered, an arrangement is disclosed providing for pivoting of the liquid-fill tube about an axis near its upper end, thus assuring that the tube will remain vertical with respect to gravity so as to prevent its interfering with the connecting rod between the ball and weight.

Another feature provides for reduced vertical dimension of the ball-and-weight, to provide more compact packaging. This feature utilizes a "folded-back" configuration for the added weight, with the ball horizontally aligned with a portion of the weight.

In accordance with a further aspect of this disclosure, the additional weight suspended from the falling ball is sub-divided into multiple segments which are separable vertically to permit sequential bottoming of each segment in turn as the ball drops down through the liquid. This produces a "stepped" output pressure pulse having an initially high-magnitude pulse of short duration followed by successive short-duration pressure pulses of progressively lower magnitude, to permit calibration of an instrument at different pressure magnitudes.

Still further features provide for avoiding or minimizing the effects of changes in static pressure on the magnitude of the reference pressure pulse. In one aspect, bulging of the liquid-filled tube with increases in static pressure is prevented by arranging the pressures on the inside and outside of the tube walls to be substantially equal at all times. In another aspect, changes in liquid density with static pressure changes are compensated for automatically by altering the density of the weight correspondingly.

Other objects, aspects and advantages of the invention will in part be pointed out in, and in part apparent from, the following description of preferred embodiments, considered together with the accompanying drawings.

BRIEF DESCRIPTION OF THE DRAWINGS

FIG. 3 is a detail vertical section illustrating one ball-and-suspended-weight configuration for increasing the reference pressure magnitude;

FIG. 4 is a graph showing how the reference pressure pulse varies with time;

FIG. 5 is a vertical section like FIG. 3 illustrating that the instrument can be inclined somewhat with respect to a vertical orientation without interfering with the functioning of the reference-pressure device;

FIG. 6 is a vertical section of a modified device for avoiding interference due to non-vertical instrument orientations;

FIG. 7 is a vertical section showing a reference-pressure device modified to reduce its vertical dimension;

DESCRIPTION OF PREFERRED EMBODIMENTS

Figure 1:
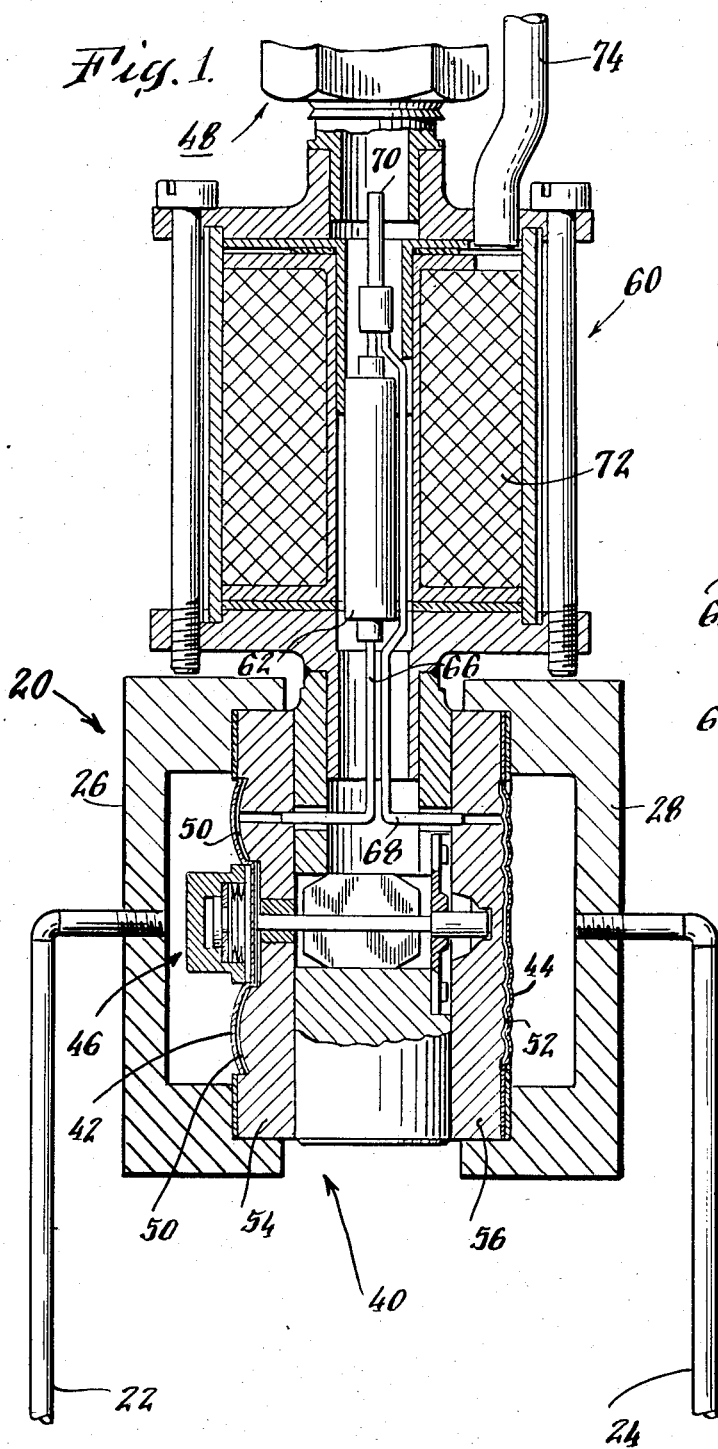
FIG. 1 is an elevation view, partly in section, showing a DP transmitter provided with span calibration means as disclosed in copending application Ser. No. 06/661,807; and filed on Oct. 17, 1984.
Figure 2:
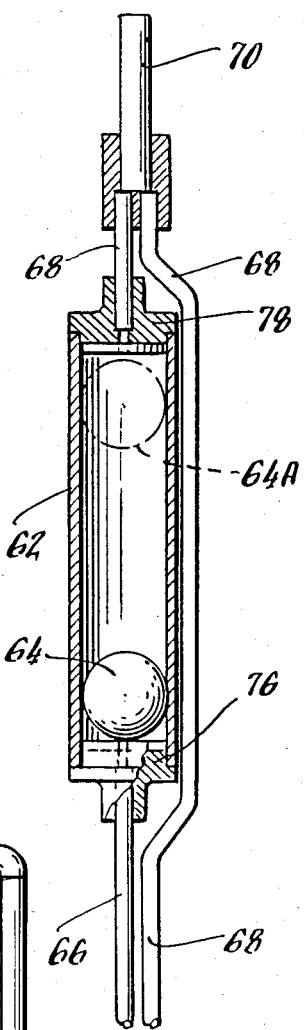
FIG. 2 is a detail vertical section through the tube-and-ball assembly shown in FIG. 1.

FIGS. 1 and 2 show a differential-pressure cell having a reference-pressure device of the type disclosed in copending application Ser. No. 06/661,807 filed by George E. Sgourakes on Oct. 17, 1984. In these figures, the differential pressure cell is generally indicated at 20, and is arranged to receive low and high process pressures from conduits 22 and 24 connected through the end plates 26 and 28 of the cell. A valved manifold (not shown) typically will be used to control the application of these process pressures. In normal operation of the instrument, the manifold valves will be open to connect the respective conduits to the process, e.g. to the downstream and upstream sides of an orifice plate in a pipe carrying a flowing fluid.

The interior body assembly 40 of the differential-pressure cell comprises diaphragms 42 and 44 arranged to receive and respond to the low and high process pressures respectively. The left-hand diaphragm 42 is a socalled range diaphragm having a specific predetermined effective area. The other diaphragm 44 is a slack diaphragm having a spring rate as low as possible (ideally zero). These two diaphragms together with the associated body structure define a sealed interior pressure chamber containing a fill-liquid, e.g. a silicon oil of relatively low viscosity.

The differential pressure applied to the fill-liquid by the diaphragms 42, 44 is the input signal to the instrument, and produces a corresponding tension force on a vibratable wire assembly 46 so that the wire will vibrate at a frequency responsive to the differential pressure input signal. The vibratable wire is connected by electrical conductor means (not shown) to electronic circuitry located in an upper housing module partially shown at 48. This circuitry may be as disclosed in U.S. Pat. No. Re. 31,416, and develops a corresponding output signal suitable for transmission to a distant station. Such signal may be in the form of an alternating signal, or a direct-current signal such as in the range of 4 to 20 ma.

The fill-liquid regions 50 and 52 between the diaphragms 42, 44 and their back-up plates 54, 56 are joined together by a common communication passageway serially including a reference-pressure device generally indicated at 50. This device is capable of producing in the fill-liquid region 60 adjacent the range diaphragm 42 an accurate and repeatable pressure pulse of constant magnitude for span calibration purposes.

This reference-pressure device 60 basically comprises a vertically-oriented cylindrical tube 62 (see also FIG. 2) containing a solid dense ball 64 of magnetizable (i.e. magnetically attractive) material such as cobalt. The lower end of the tube 62 is connected by a conduit 66 to the fill-liquid region 50 adjacent the range diaphragm 42, while the top of the tube is connected by another conduit 68 to the fill-liquid region 52 adjacent the slack diaphragm 44. A fill tube 70 provides for inserting the fill-liquid.

Surrounding the tube 62 is a solenoid winding 72 adapted to be energized by an electrical current to produce in the tube a magnetic field of sufficient strength to raise the ball 64 to the top of the tube as shown at 64A. A protective conduit 74 is provided for the wires (not shown) leading to the winding.

When the winding 72 is deactivated, the ball will drop down under the force of gravity so as to move through the fill-liquid in the tube and develop a pressure pulse which is transmitted to the fill-liquid region 50 next to the range diaphragm 42. As noted above, this pulse may be used for span calibration purposes. At the bottom of the drop, the ball will come to rest on a radially-slotted end plate 76 (FIG. 2) arranged to prevent the ball from sealing off fill-liquid communication between the regions 50 and 52. A similar end plate 78 is at the upper end of the tube.

To carry out a calibration operation, a known manifold arrangement (not shown) connected to conduits 22 and 24 is operated to create a zero differential pressure as the input signal to the instrument while capturing the process static pressure at both diaphragms 42 and 44. The instrument zero then is checked, and set if necessary, using known techniques.

The solenoid winding 72 then is energized to raise the ball 64 which, when released descends through the fill-liquid under the force of gravity to produce the reference-pressure pulse across the range diaphragm 42. The output signal of the DP transmitter is monitored during this time, and if the output signal pulse differs in magnitude from the correct value, electronic span-adjusting circuitry will be adjusted (see the U.S. Pat. No. Re. 31,416) to fix the output at the correct value.

The pressure pulse developed by the fallingball pressure device 60 provides a very accurate signal for calibration purposes. The resulting pressure pulse is of essentially constant magnitude for a large part of the ball movement with very high repeatability for many actuations over relatively long periods of time. Moreover, the magnitude of the pressure pulse is basically unaffected by changes in viscosity, such as might be caused by temperature variations. However, for certain applications it has been found highly desirable to provide a reference-pressure pulse of substantially greater magnitude than can be produced by the device shown in FIG. 2.

FIG. 3 illustrates a fall-ball arrangement which provides significant improvement over that shown in FIG. 2. In the FIG. 3 arrangement, the tube 62, ball 64, and fluid conduits 66 and 68 correspond to the same-numbered elements of FIG. 2. The remainder of the instrument structure has been omitted for the sake of simplicity.

Referring now to FIG. 3 in more detail, it will be seen that a cylindrical fluid chamber 80 is formed at the lower end of the vertical tube 62, and contains a relatively large cylindrical weight 82, suspended from the ball 64 by a rigid connecting rod 84.

The diameter of the weight 82 is significantly smaller than that of the chamber 80, so as to provide substantial space between the weight and the chamber wall. Thus, movement of the weight down through the liquid in the chamber is not appreciably impeded by viscous drag force which otherwise would result if the weight were in close proximity to the chamber wall (as the movement of the ball 64 is slowed down by its close fit within the tube 62). Accordingly, the gravity force on the weight 82 is for the most part transferred to the ball, augmenting the gravity force of the ball itself, and tending to move the ball more forcefully down through the tube than if the weight were not present.

This added force on the ball 64 due to the suspended weight 82 in effect increases the apparent density of the ball 64. That is, the net force on the ball is increased just as though the density of the ball had been increased. This in turn increases the magnitude of the differential pressure pulse produced by the movement of the ball down through the tube 62, as indicated by the following approximate expression for such differential pressure:

$$\Delta P = (\tfrac{2}{3}(d^3/D^2))(\tau_B - \tau_L) \tag{1}$$

where:
 $d$ = diameter of ball
 $D$ = inside diameter of tube
 $\tau_B$ = effective density of ball
 $\tau_L$ = density of liquid It has been found that the weight 82 can provide a very large increase in differential pressure produced by the falling ball 64. For example, a ball configuration producing a differential pressure of about 1 inch of water can with the addition of a suspended weight, as described, develop up to 100 inches of water as illustrated by the time graph of FIG. 4. Essentially all of the pressure drop occurs across the ball 64, with an insignificant drop across the weight 82, due to the large spacing between the weight and the wall of the chamber 80.

Placing the weight below the ball has proved to be superior in most respects to the opposite case, particularly since it eliminates any need for guiding the weight in its bore. Moreover, the described arrangement is relatively insensitive to changes in inclination of the support structure (e.g. a differential-pressure instrument) which sometimes occurs in practical field installations. Since the weight effectively is pivoted at the ball, the tube can be inclined several degrees from vertical without the connecting rod or the weight touching the side of the tube. FIG. 5 has been included to show such support structure inclined up to an angle $\alpha$ without producing any interference.

In the event that the instrument (or other supporting structure) is expected to be subjected to larger inclination angles than shown in FIG. 5, an alternative construction such as illustrated in FIG. 6 can be used. In this arrangement, the tube 62 is pivotally mounted on the support structure, as indicated at 86, so that it will always remain vertical (as will the ball-rod-weight assembly). A weight-ring can be provided at the lower end of tube 62 to help assure vertical orientation. A flexible bellows seal 88 accommodates pivoting movement with sealed fluid flow. A chamber 80A integral with the instrument or other support structure contains liquid within which the weight 82 is suspended. This structure can incline at relatively large angles (as shown) without interfering with the functioning of the reference-pressure device.

In some applications, it may be desirable to minimize the vertical dimension of the falling-ball device. FIG. 7 has been included to illustrate one way of providing that characteristic. It will be seen that in this arrangement the weight 82A has a "folded-back" configuration comprising a lower disc portion 90 and a cylindrical upper portion 92 surrounding the tube 62. The "folded-back" upper portion 92 extends up to a position laterally opposite the ball 64, and for some applications may extend up to a point well above the ball.

It may be desirable to calibrate some instruments at more than one pressure. Such multi-point calibration can be effected by the arrangement shown in FIG. 8, wherein the ball 64 carries a plurality of circular weights 94A, 94B, and 94C having progressively smaller diameters. These weights are supported by a vertical spindle 96 accommodating independent vertical movement of the weights.

Figure 8:
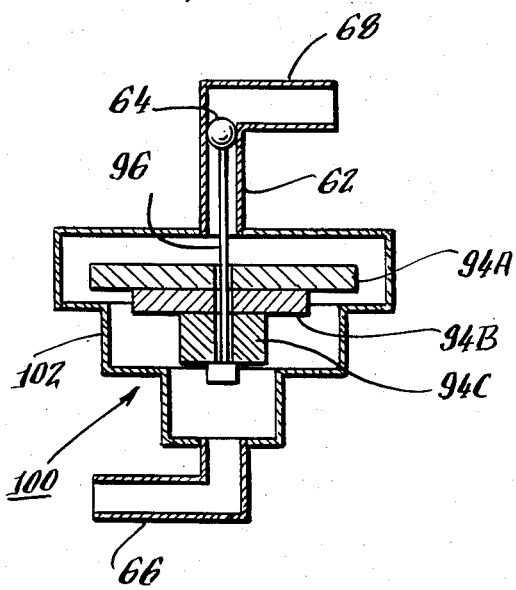
FIGS. 8 and 9 are vertical sections of a reference-pressure device arranged to produce a series of pressure pulses of progressively smaller magnitudes, to provide for multi-point calibration.

When the ball 64 begins to fall, all of the weights are carried by the spindle 96, as shown in FIG. 8. Thus, the entire mass of the weights is initially added to that of the ball, resulting in a maximum gravity force on the ball, and producing a maximum differential pressure pulse as illustrated at 98A in the graph of FIG. 10.

Figure 9:
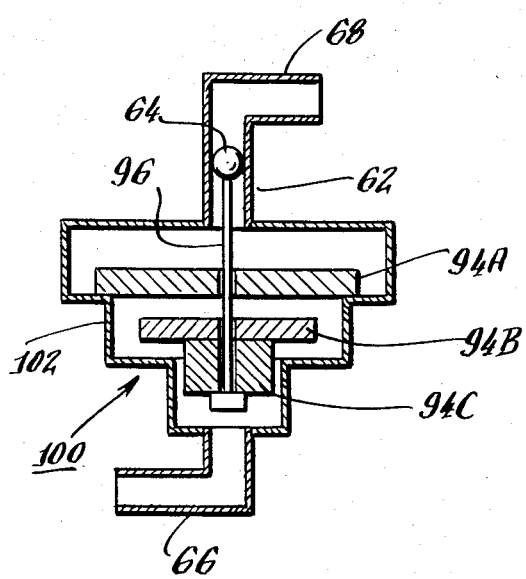
Figure 10:
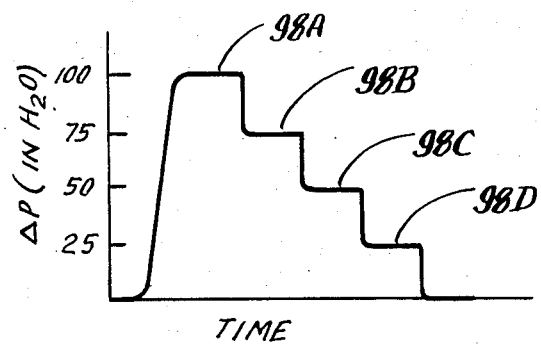
FIG. 10 is a graph showing the manner in which the output pressure of the FIG. 8 device varies with time.

The housing 100 containing the weights 94A,B,C is formed with a stepped side wall 102 so arranged that the separate weights will touch down at different vertical positions during their descent. Thus, after the initial drop-off of all weights, producing the initial large magnitude pressure pulse 98A, the top weight 94A will touch down on its corresponding step on the side wall 102 (as shown in FIG. 9) so that the gravity force on that weight will no longer be transmitted to the ball 64. Accordingly, the differential pressure produced by the ball thereafter will correspondingly be reduced, as shown at 98B in the graph of FIG. 10. As each succeeding weight touches down, the output pressure will correspondingly be reduced, resulting in a stepped output pressure signal as shown in FIG. 10, producing a sequence of progressively lower pressure pulses. If it is desired to have the pressure pulses differ by equal amounts, the weights 94A, etc. should be of equal mass.

The static pressure applied to the instrument often may change significantly from time to time, and in many applications it is important to prevent such changes from creating corresponding errors in calibration. One possible source of such error is the bulging (or contraction) in the diameter of the tube 62 resulting from a static pressure increase (or decrease). Since the differential pressure produced by a falling ball is proportional to its submerged weight divided by the cross-sectional area of the tube any change in area results in a correponding change in the generated pressure.

Figure 11:
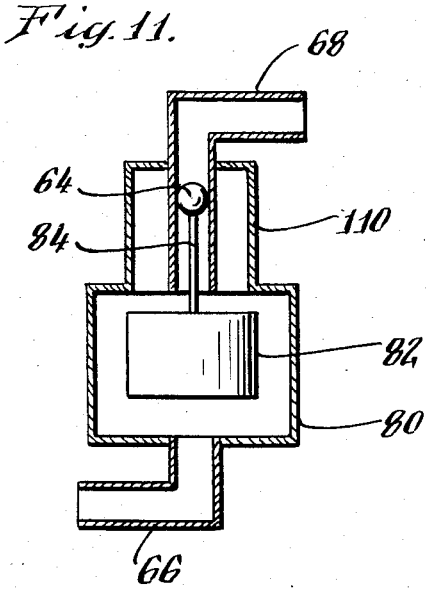
FIG. 11 is a vertical section showing a reference-pressure device arranged to provide equal pressures on both sides of the liquid-filled tube wall.

FIG. 11 shows an arrangement for avoiding or minimizing such effects of static pressure changes. In this construction, the lower weight-containing chamber 80 has been extended up to surround the tube 62, as shown at 110. Thus, the pressures on the inside and outside surfaces of the tube wall always will be equal, so as to prevent any bulging of the tube diameter, and thereby preventing any changes in the reference-pressure signal due to such static-pressure-induced bulging.

Another source of error due to changes in static pressure is the change in liquid density that occurs with changes in static pressure. Since the reference-pressure output signal of the described device is proportional to the weight of the falling mass minus its buoyant force, changes in liquid density causing a change in buoyant force will in turn cause a change in the ΔP. However, such potential error can be minimized by maintaining $(\tau_W - \tau_L)$ constant. More specifically, as the liquid density $\tau_L$ increases with an increase in static pressure the density of the weight $\tau_W$ should be made to increase correspondingly.

Figure 12A:
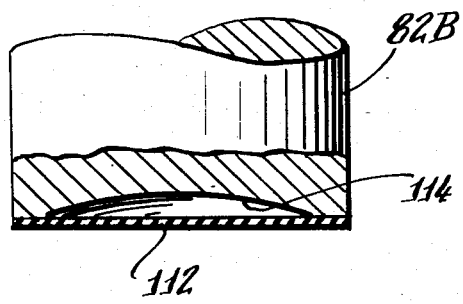
FIGS. 12A and 12B are detail vertical sections showing a weight structure providing a pressure-responsive density characteristic which compensates for pressure-induced changes in density of the fill-liquid.
Figure 12B:
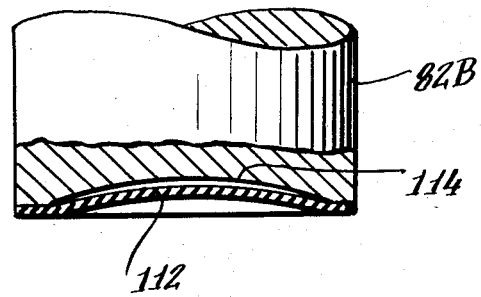

FIG. 12A shows a weight 82B having a density which changes automatically with changes in static pressure of the surrounding liquid. This weight includes a pressure-responsive diaphragm 112 which, when under zero static pressure (as shown), extends straight across a shallow depression 114 in the weight. As static pressure increases, the diaphragm deflects inwardly, as shown in FIG. 12B, thereby reducing the total volume of the weight. The diaphragm is so constructed that the change in volume of the weight (with its corresponding change in weight density) compensates for the increase in buoyant force due to the increased fluid density. The design can be so arranged that any increase in static pressure beyond the static pressure limit of the associated pressure measuring instrument would result in the diaphragm bottoming out against the curved surface of the depression 114 so as to prevent inelastic behavior or permanent damage to the diaphragm.

Although several preferred embodiments of the invention have been described hereinabove in detail, this has been for the purpose of illustrating the principles of the invention, and should not necessarily be construed as limiting of the invention since it is apparent that those skilled in the art can make many modified arrangements based on the principles of the invention without departing from the true scope thereof.

What is claimed is:

1. In a pressure measuring instrument of the type including a sealed interior pressure chamber containing a fill-liquid and having diaphragm means to apply thereto an input pressure signal to be measured, said instrument further including sensing means responsive to the input pressure signal applied to said fill-liquid to produce a corresponding output signal;

that improvement for calibrating the span of the instrument comprising:

a reference pressure device forming an integral part of said instrument and including a cavity formed as part of said interior chamber;

an object in said cavity sized to provide a close fit with the cavity walls so that the object when moved by the force of gravity through the cavity will produce a reference pressure signal for said instrument; and a weight in said chamber coupled to said object to augment the gravity force on said object and thereby increase the magnitude of said reference pressure signal.

2. A device as in claim 1, wherein said weight is below said object.

3. A device as in claim 2, wherein said weight is suspended from said object by a connecting element.

4. A device as in claim 3, wherein said connecting element is a rigid rod.

5. A device as in claim 2, including means defining a chamber region beneath said cavity and containing said weight;

said chamber region being filled with liquid communicating with said cavity.

6. A device as in claim 5, wherein said cavity has an axial dimension through which said object moves, and a predetermined cross-sectional area transverse to said dimension;

said weight being movable through said chamber region in a direction parallel to said axial dimension the cross-sectional area of said chamber region transverse to said direction being substantially larger than that of said cavity;

the mass of said weight being substantially greater than that of said object.

7. A device as in claim 6, wherein said cavity comprises a vertically-mounted cylindrical tube;

said object having a circular cross-section to fit in said cylindrical tube.

8. A device as in claim 7, wherein said crosssectional area of said chamber region is circular and coaxial with said tube.

9. A device as in claim 8, wherein said weight is cylindrical in shape with its axis coincident with the axis of said chamber.

10. A reference-pressure device comprising:
a support structure;
means forming a liquid-filled cavity having a vertical axial dimension;
an object in said cavity sized to provide a close fit with the inner walls thereof and movable by gravity through said vertical dimension to produce a reference-pressure signal;
means forming a liquid-filled chamber adjacent said cavity and communicating therewith;
a weight in said chamber;
an element connecting said weight to said object so that the gravity force on said weight increases the force tending to move said object down through said cavity; and
means mounting said cavity means for pivotal movement with respect to said support structure to provide that said axial dimension remains vertical regardless of changes in inclination of said support structure, thereby to avoid interference between said cavity means and said object-element-weight assembly.

11. A device as in claim 10, wherein at least part of said chamber is beneath said cavity; and
flexible liquid-seal means at the upper end of said cavity means to accommodate said pivoted movement.

12. A device as in claim 11, wherein said seal means includes a bellows.

13. A device as in claim 10, wherein said cavity means is a vertically-mounted tube.

14. A device as in claim 13, wherein said object is a ball.

15. A device as in claim 14, wherein said connecting means is a rigid rod joining said ball and said weight.

16. A reference-pressure device comprising:
means forming a liquid-filled cavity having an axial dimension;
an object in said cavity sized to provide a close fit with the inner wall surfaces thereof and movable along said dimension to produce a reference-pressure signal;
a weight outside of said cavity and operatively coupled to said object to increase the force thereon tending to move the object through said cavity;
said weight having a first portion located below said object and a second portion which extends up from said first portion to a position at least alongside of said object, whereby to provide for minimization of the total vertical dimension of the cavity-and-weight assembly.

17. A device as in claim 16, wherein said axial cavity is formed by a vertically-positioned tube;
a liquid-filled chamber having a first region below the lower end of said tube and having side walls forming a second region extending up alongside and around said tube;
said second weight portion being located in said second region.

18. A device as in claim 17, wherein said second weight portion is cylindrical and extends around said tube.

19. A reference-pressure device comprising:
means forming a liquid-filled cavity having an axial dimension;
an object in said cavity sized to provide a close fit with the inner wall surfaces thereof and movable along said dimension to produce a reference-pressure signal;
a plurality of weights outside of said cavity;
means supporting said weights and providing for independent downward movement thereof under the force of gravity;
means operatively coupling said weights to said object so that the gravity force on said weights increases the force tending to move said object through said cavity; and
means to stop the downward movement of each of said weights individually and successively as they move down while applying force to said object, whereby to progressively reduce the force applied to said object as it moves through such cavity, so as to develop a reference pressure pulse having a stepped pressure characteristic.

20. A device as in claim 19, wherein said cavity dimension is vertical to provide that gravity produces a force on said object tending to move it down through said cavity.

21. A device as in claim 20, wherein said weights are located below said object.

22. A device as in claim 21, wherein said weights are in a liquid-filled chamber below, and communicating with, the liquid-filled interior of said cavity.

23. A device as in claim 19, wherein said weights are arranged in a stack, one above the other.

24. A device as in claim 23, wherein said weights have progresively-differing lateral dimensions, with the lowest weight having the smallest; and
a housing for said weights formed with vertically-offset support areas of progressively-differing transverse dimensions arranged to receive and stop the movement of said weights respectively as they move down through said housing, whereby to reduce the force applied thereby to said object.

25. A reference-pressure device comprising:
means forming a liquid-filled cavity having an axial dimension;
an object in said cavity sized to provide a close fit with the inner wall surfaces thereof and movable along said dimension to produce a reference-pressure signal;
means forming a liquid-filled chamber outside of said cavity and in liquid communication therewith;
a weight in said chamber operatively coupled to said object to increase the force thereon and tending to move it through said cavity;
said chamber being formed to include a portion alongside at least a part of the wall of said cavity whereby to insure that the pressures on the inside and outside surfaces of that part of the cavity wall will be equal.

26. A device as in claim 25, wherein said chamber portion surrounds said cavity wall at least substantially along the length of said axial dimension.

27. A device as in claim 26, wherein said cavity is formed by a tube;
said chamber portion being cylindrical.

28. A reference-pressure device comprising:
means forming a liquid-filled cavity having an axial dimension;
an object in said cavity sized to provide a close fit with the inner wall surfaces thereof and movable therealong to produce a reference-pressure signal;

means forming a liquid-filled chamber outside of said cavity and in liquid communication therewith;

a weight in said chamber operatively coupled to said object to increase the force thereon and tending to move it through said cavity;

said weight including pressure-responsive means to effect a change in the volume of said weight with changes in liquid pressure, thereby to compensate for changes in liquid density with changes in pressure.

29. A device as in claim 29, wherein said pressure-responsive means comprises a diaphragm secured to said weight and deflectable inwardly by pressure increases so as to reduce the total volume of the weight.

* * * * *